(12) United States Patent
White

(10) Patent No.: X9342
(45) Date of Patent: Jan. 23, 1836

(54) CEMENT, HYDRAULIC

(76) Inventor: John White

John White of Syracuse State of New York.

Letters Patent.

The schedule referred to in these Letters Patent and making part of the same containing a description in the words of the said John White himself of his improvement in the application of Hydraulic cements to the making of Coffins Whereas I John White of Syracuse in the county of Onondaga and State of New York did in conjunction with Daniel Dayton and Hiram Hoyt both of the same State obtain Letters Patent of the United States, bearing date the sixth day of June Eighteen hundred and thirty five, for an invention in making and constructing coffins from American or Hydraulic Cement, and whereas I did in my own name obtain Letters Patent of the United States for certain improvements thereon which Letters Patent bear date the twenty fifth day of July eighteen hundred and thirty five. Now be it known that I the said John White have since the dates of the above named Patents made further improvements in making such Coffins, and I do hereby declare that the foregoing is a full and exact description thereof.

My improvements consist in the employing of any of the known Hydraulic Cements, materials, mortars, which will consolidate into a substance resembling stone, under whatever name the same may be known if prepared from Hydraulic lime, or whether the same may be produced by the calcination, and combination of such materials as will produce an analogous cement without presence of Native Hydraulic Lime. In the formation of such Coffins I proceed by any of the methods referred to in the above named Letters Patent or by any other producing a like effect.

All that I claim under the foregoing Specification, and wish to secure by Letters Patent is the right to employ any of the known Hydraulic cements materials or mortars, not included in the before mentioned Patents in the making of receptacles for the dead, constructing the same in any

United States Patent

Patent No.: X9342 form or shape which may be deemed convenient or desirable.

Witnesses. B. R. Morrill
James Brown

John White

Ex.
Chf. Clk

Process